March 1, 1927.  L. H. SANFORD  1,619,767
BRAKE SHOE KEY HOLDER
Filed Nov. 2, 1925
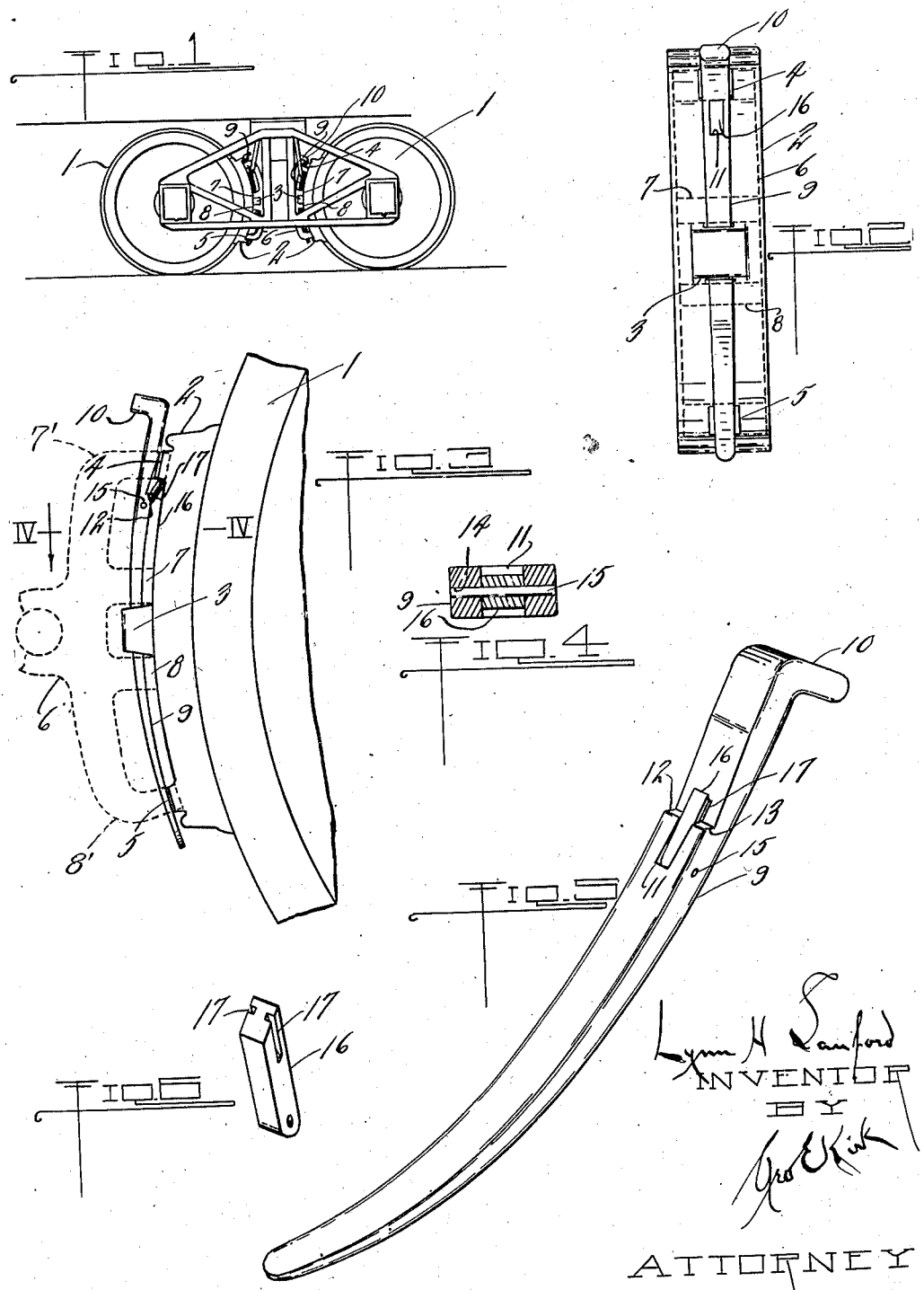

Patented Mar. 1, 1927.

1,619,767

UNITED STATES PATENT OFFICE.

LYNN H. SANFORD, OF TOLEDO, OHIO, ASSIGNOR OF ONE-HALF TO CHARLES L. MANN, OF TOLEDO, OHIO.

BRAKE-SHOE-KEY HOLDER.

Application filed November 2, 1925. Serial No. 66,230.

This invention relates to friction anchoring means or locking means for keys.

This invention has utility when incorporated in holders for anchoring railway rolling stock brake shoe keys.

Referring to the drawings:

Fig. 1 is a fragmentary view of a railway car truck having brake shoe key anchored in accordance with the invention herein;

Fig. 2 is a view of the key in assembled position with the brake shoe from the side thereof remote from the wheel;

Fig. 3 is a side elevation of the assembled brake shoe key with the brake shoe;

Fig. 4 is a section on the line IV—IV, Fig. 3, through the pivotal mounting of the holder with the key;

Fig. 5 is a view of the cut-out key for the mounting of the holder; and

Fig. 6 is a detail view of the holder apart from the key.

Car wheel 1 is shown as provided with brake shoe 2 having an eye 3 and lugs 4, 5, spaced on opposite sides from said eye 3. Brake head 6 has eyes 7, 8, on opposite sides of the eye 3 of the brake shoe. Key 9 has its wedge or quill portion insertable through the registering eyes 7, 3, 8, with forks 7' 8', adjacent the lugs 4, 5, to thereby snugly assemble the brake shoe 2 with the brake beam 6 for swinging into and out of gripping relation with the car wheel 1.

In current railway practice, the brake shoe keys have a tendency for working out, possibly due to vibrations and concussions as experienced in the normal handling of such rolling stock. However, there is additional extreme handling of such stock in the dumping of the cars as effected by elevating the car and turning it over to spill the contents into a chute as in loading vessels. This orienting of the car brings the key 9 with its head 10 downwardly and thus exposes such key for slippage out of assembly position for thereby releasing the brake shoe from the brake head.

Under the invention of this disclosure, wedge key or quill portion 9 has formed therein a slot 11 with limit notch portions 12, 13, on opposite sides thereof. This slot or cut-away portion 11 in the quill or wedge portion 9 inner side is in position to extend away from the lug 4 in the assembled position of the key with the brake shoe. Remote from the position of the lug 4, this slot 11 has transverse opening 14 for pivot pin 15 upon which is pivotally mounted trigger or holder 16 swingable in the notch 11 as the key 9, 10, is thrust into assembled relation with the brake shoe and brake beam. When so assembled, slot or lateral way portion 17 in the sides of the trigger 16 are exposed through the respective cut-away portions 13, so that flat ended tool, as a screw driver, may engage such way 17 and be operated as a pry against the wall of the key in swinging this trigger 16 on the pivot pin 15 toward the wheel 1 so that the free end of this trigger 16 abuts the lug 4. The mounting of this trigger 16 is a snug or friction fit and in the event of corrosion serves as an effective lock in holding the key against removal. The frictional binding is sufficient to serve as an effective holding even against vibration of this trigger against the shoe 2 at the lug 4.

In the event a brake shoe is worn, and it is desired to have such replaced even though the trigger 16 be corroded, a wedge may be inserted between this trigger and the back of the brake shoe to force the free end of this trigger back into the notch or recess 11, thereby permitting withdrawal of the key 9, 10, and substitution of another brake shoe in the assembly. There is, accordingly, provided a definite locking mechanism of simple form, positive in its coaction under all circumstances. Furthermore, this is a scheme adaptable to general types of brake shoes in wide ranges or character of equipment and brake structures. By placing the trigger adjacent the head of the key, there is a compact assembly for the widest range of adaptation in current rolling stock practice.

What is claimed and it is desired to secure by United States Letters Patent is:

1. A brake shoe having an eye portion and a lug, a key having a wedge acting quill portion insertable through said eye portion, said key adjacent said lug terminating in a head and provided with a way in said quill portion, a pivot pin transversely of said way, and a trigger friction tight held in said way against shifting, mounted by said pin in said way and swingable by prying to project from said key.

2. A brake shoe having an eye portion and a lug, a key having a wedge acting quill portion insertable through said eye portion, said key adjacent said lug terminating in a head and provided with a way in said quill portion, a pivot pin transversely of said way, and a rigid trigger mounted by said pin friction tight in said way and swingable by prying to project toward said shoe, said trigger having a lateral recess engageable to shift the trigger on its pivot pin.

3. A brake shoe having an eye portion and a lug, a key having a wedge acting quill portion insertable through said eye portion, said key adjacent said lug terminating in a head and provided with a way in said quill portion, a lateral clearance to said way, a pivot pin transversely of said way, and a rigid trigger mounted by said pin for friction tight assembly in said way and swingable only by prying to form an abutment, said trigger having a lateral recess accessible through the lateral clearance to said way for engagement to shift the key into abutment providing position.

In witness whereof I affix my signature.

LYNN H. SANFORD.